Patented Mar. 26, 1929.

1,706,927

UNITED STATES PATENT OFFICE.

LEOPOLD LASKA AND FRITZ WEBER, OF OFFENBACH-ON-THE-MAIN, GERMANY, ASSIGNORS TO GRASSELLI DYESTUFF CORPORATION, OF NEW YORK, N. Y., A CORPORATION OF DELAWARE.

ORTHO-HYDROXYAZODYESTUFFS AND PROCESS OF MAKING SAME.

No Drawing. Application filed September 26, 1927, Serial No. 222,200, and in Germany October 5, 1926.

Our present invention relates to new ortho-hydroxyazodyestuffs corresponding probably in form of the free acids to the general formula:

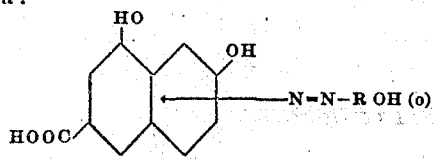

wherein R means an aromatic residue, which dyestuffs may be obtained by combining aromatic ortho-hydroxydiazocompounds with 2.8-dihydroxynaphthalene-6-carboxylic acid. (We are not sure, whether by this process the azogroup enters in 1, 5 or 7-position of the naphthalene nucleus.)

The dyestuffs thus obtained are when dry blackish powders, soluble in concentrated sulfuric acid with a reddish to bluish color. They are valuable mordant dyestuffs, distinguished by an excellent evenness of their dyeings, they dye wool brownish tints turning to fast brown to black shades when after chromed.

The 2.8-dihydroxynapthalene-6-carboxylic acid unknown hitherto can be obtained by sulfonating the 2.6-naphthol-carboxylic acid and subjecting the 2-naphthol-8-sulfo-6-carboxylic acid thus obtained to the caustic alkali fusion.

In order to further illustrate our invention the following examples are given, the parts being by weight and all temperatures in centigrade degrees, but it is understood, that our invention is not limited to the particular products or reacting conditions mentioned therein.

Example 1.

14, 35 parts of 4-chloro-2-aminophenol are diazotized in the usual manner and the diazosolution thus obtained is allowed to run in into a solution of 21 parts of 2.8-dihydroxynaphthalene-6-carboxylic acid containing a sufficient amount of milk of lime to neutralize all the acid. When the combination is complete the lime is precipitated by adding carbonate of soda and removed by filtration. The dyestuff formed having probably the formula:

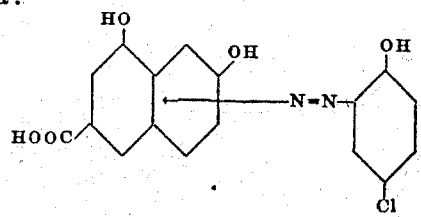

is separated by adding salt to the filtrate.

It dyes cotton uniformly brown shades; by afterchroming black dyeings are obtained of an excellent fastness to alkali, decatizing (i. e., the action of steam), stoving (i. e., the treatment with gaseous sulfur dioxide produced by burning sulfur), milling (i. e., treatment of the dye-goods with a soap solution at about 30–40° C.) and water (i. e., rinsing).

Example 2.

15, 4 parts of 4-nitro-2-aminophenol are diazotized in the usual manner and the diazosolution thus obtained is allowed to run in into a solution of 21 parts of 2.8-dihydroxynaphthalene-6-carboxylic acid, made alkaline by adding milk of lime. The dyestuff thus obtained having probably the formula:

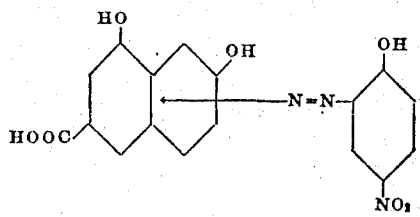

is isolated as described in Example 1. It dyes wool brown shades, turning to an olive of an excellent fastness, when afterchromed.

Example 3.

19, 8 parts of para-nitro-ortho-aminosalicylic acid are diazotized in the usual manner and the diazosolution thus obtained is added to a solution of 21 parts of 2, 8-dihydroxynaphthalene-6-carboxylic acid, made alkaline by adding carbonate of soda. When the combination is complete the dyestuff thus obtained having probably the formula:

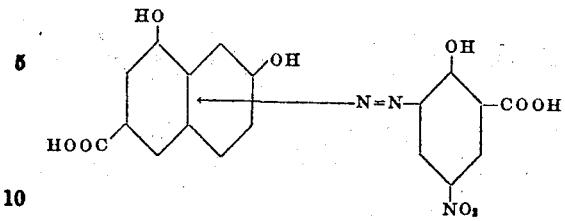

is salted out and worked up as usually. It dyes wool reddish brown shades. By afterchroming a brown fast to milling and potting is obtained.

*Example 4.*

19, 9 parts of picraminic acid are diazotized in the usual manner and the diazocompound obtained is added to a solution of 21 parts of 2.8-dihydroxynaphthalene-6-carboxylic acid, made alkaline by adding carbonate of soda. When the combination is complete the dyestuff, having probably the formula:

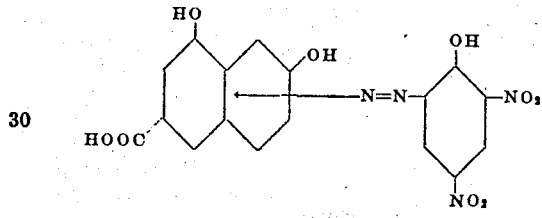

is salted out and worked up in the usual manner. It dyes wool violet-brown shades. By afterchroming a black-green is obtained fast to milling and potting.

With other ortho-hydroxydiazocompounds such as of nitro-amino-para-cresol, para-chloro-ortho-nitro-ortho-aminophenol, nitro-aminophenolsulfonic acids or ortho-amino-naphtholsulfonic acids and with ortho-hydroxydiazoazocompounds the combination may be carried out in a corresponding manner.

We claim:

1. As new products the ortho-hydroxyazodyestuffs, corresponding probably in form of the free acids, to the general formula:

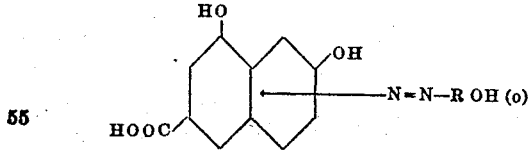

wherein R means an aromatic residue, which dyestuffs are when dry blackish powders, soluble in concentrated sulfuric acid with a reddish to bluish color, being valuable mordant dyestuffs, dyeing wool brownish tints of an excellent evenness, turning to fast brown to black shades when afterchromed, which dyestuffs are substantially identical with those obtainable by combining aromatic ortho-hydroxydiazocompounds with 2.8-dihydroxynaphthalene-6-carboxylic acid.

2. Process for producing new azodyestuffs which process comprises combining aromatic ortho-hydroxydiazocompounds with 2.8-dihydroxynaphthalene-6-carboxylic acid.

3. Process for producing new azodyestuffs which process comprises combining aromatic ortho-hydroxydiazocompounds with 2.8-dihydroxynaphthalene-6-carboxylic acid in an alkaline solution.

4. Fibrous material dyed with the dyestuffs claimed in claim 1.

5. As new products the ortho-hydroxy azodyestuffs, corresponding probably in form of the free acids to the formula:

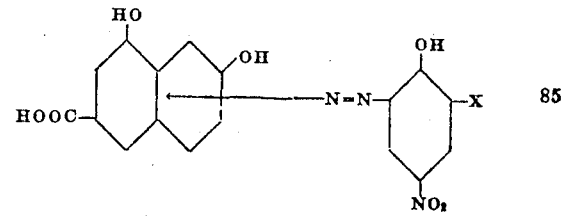

wherein X means hydrogen or the carboxylic group, which dyestuffs are when dry blackish powders, soluble in concentrated sulfuric acid with a reddish to bluish color, being valuable mordant dyestuffs dyeing wool brownish tints of an excellent evenness, turning to fast brown to olive shades, when afterchromed, which dyestuffs are substantially identical with those obtainable by combining the diazocompounds of aromatic ortho-hydroxyaminocompounds of the formula:

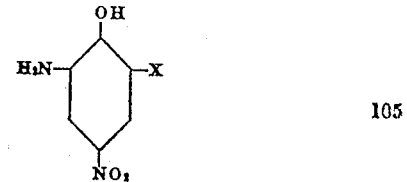

wherein X has the aforesaid signification, with 2.8-dihydroxynaphthalene-6-carboxylic acid.

In testimony whereof, we affix our signatures.

LEOPOLD LASKA.
FRITZ WEBER.